United States Patent [19]

Larson

[11] 4,197,050
[45] Apr. 8, 1980

[54] BOAT GUIDE ASSEMBLY FOR A BOAT TRAILER

[76] Inventor: Leon H. Larson, P.O. Box 998, Dunnellon, Fla. 32630

[21] Appl. No.: 916,506

[22] Filed: Jun. 19, 1978

Related U.S. Application Data

[63] Continuation-in-part of Ser. No. 805,233, Jun. 9, 1977, abandoned.

[51] Int. Cl.$^2$ .............................................. B60P 1/46
[52] U.S. Cl. .................................. 414/529; 280/414 R
[58] Field of Search ......... 214/84; 280/414 R, 414 A; 414/529

[56] References Cited

U.S. PATENT DOCUMENTS

| | | | |
|---|---|---|---|
| 3,021,969 | 2/1962 | Peake et al. | 280/414 R X |
| 3,160,297 | 12/1964 | Stumvoll | 214/84 |
| 3,632,138 | 1/1972 | Whitley, Jr. | 280/414 R X |
| 3,837,509 | 9/1974 | Gladnick | 214/84 |
| 3,873,130 | 3/1975 | Whitley, Jr. | 214/84 |

Primary Examiner—Albert J. Makay
Attorney, Agent, or Firm—Stein & Frijouf

[57] ABSTRACT

An assembly is disclosed for retaining a boat hull centered on a boat trailer during launching and loading of the boat. The assembly includes a pair of guides each extending upwardly from the rear or loading and launching end of the trailer for engaging opposite sides of the hull and urging the hull to a centered position relative to the trailer. The guides may be covered with polyvinyl chloride to present a smooth, low friction surface for engaging the hull without marring it as the hull moves past the tubes. Lower ends of the tubes are curved inwardly with the vertical sides of the tubes being flattened to reduce flexing of the tubes transversely of the hull. The lower tubing ends are received in a snug fitting channel, with upper and lower faces of the tubes tightly clamped toward each other to expand the flattened sides into tight engagement with legs of the channel.

6 Claims, 7 Drawing Figures

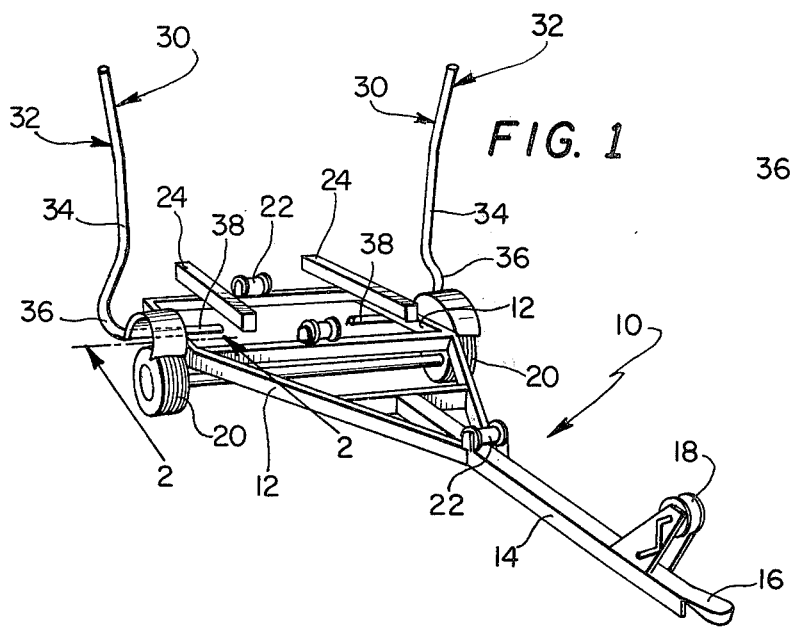
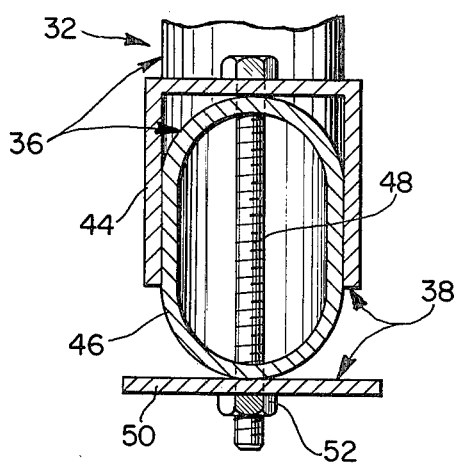
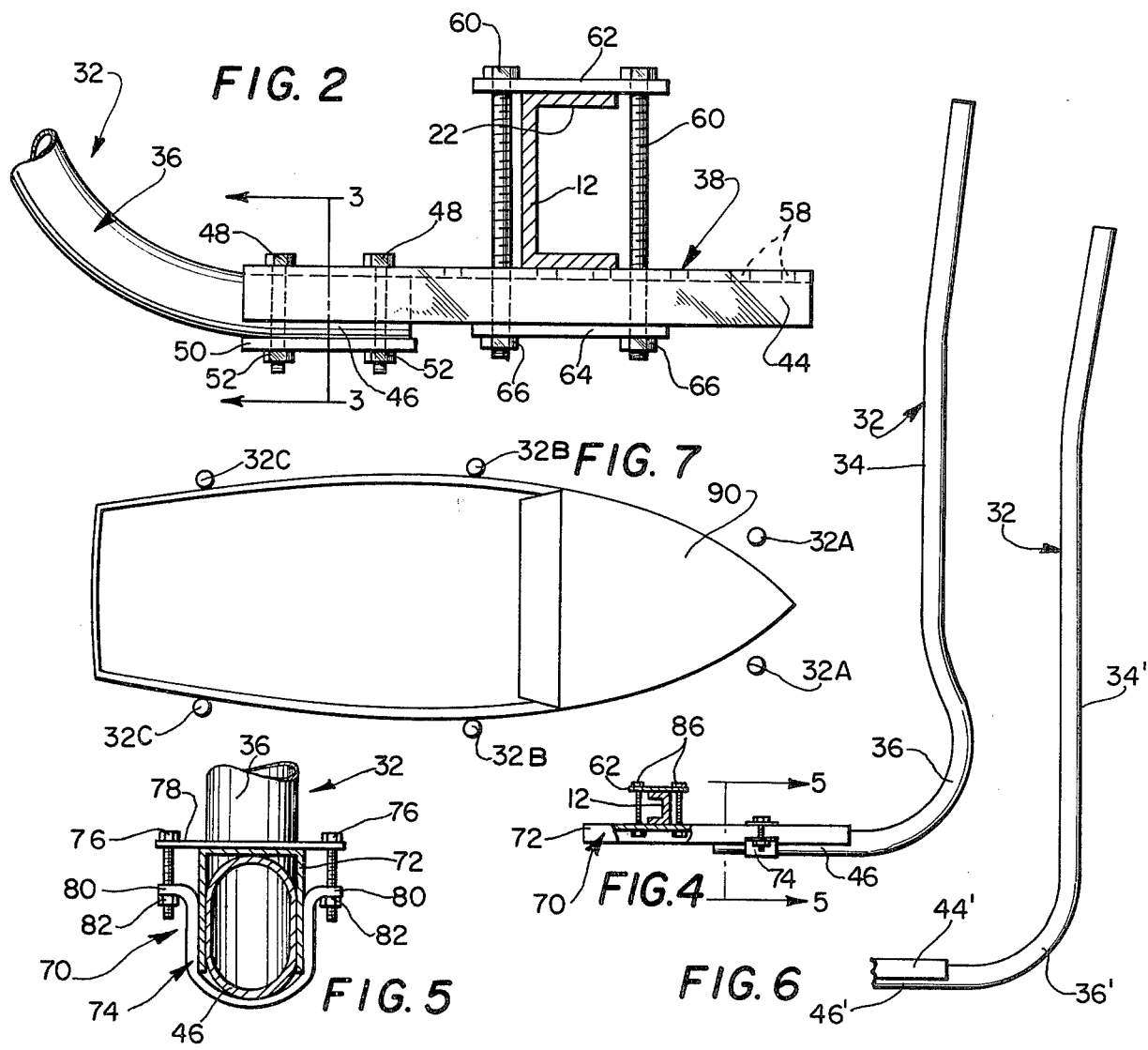

BOAT GUIDE ASSEMBLY FOR A BOAT TRAILER

This application is a continuation-in-part of my now abandoned patent application Ser. No. 805,233, filed June 9, 1977, now abandoned, and hereby incorporated herein by reference.

FIELD OF THE INVENTION

This invention relates to a boat centering guide assembly for a boat trailer, and to such a guide per se.

BACKGROUND OF THE INVENTION

Various types of guides have been devised for aiding in launching boats from and loading boats onto boat trailers. Such guides may be divided into two general classes, resilient and non-resilient guides.

Non-resilient guides serve generally only as markers for indicating the location of a submerged or partially submerged trailer and act as rigid pilings to stop sidewise movement of the boat during launching or loading thereof. Since the hull is normally narrower near the stern that at other portions, unless special provision is made for moving non-resilient guides toward and away from each other, the guides must be spaced apart far enough for the widest part of the hull to move therebetween during loading and unloading.

Resilient guides overcome these difficulties by flexing toward or away from each other but are normally relatively expensive and subject to wear because of interengaging parts which move against each other and are subject to jamming of the parts by sticks, seaweed, and the like. For example, coil or spiral springs are prone to snagging seaweed, and the like, and a stick may become jammed as a pivot assembly closes. Furthermore, relatively moving parts generally require lubrication which is generally overlooked since the owner is considerably more interested in the boat than in the trailer. Another charactieristic of resilient type guides is that they are provided with rollers, or the like, which protrude and are likely to snag on part of the hull, such as spray rails, for example. Such snagging is particularly likely to occur if the hull lists during launching or loading, as when a person sits on the gunnel of a small boat, or in heavy weather when the hull lists from side to side.

The following United States patents show various forms of both resilient and non-resilient guides of the previously discussed types: U.S. Pat. Nos. 2,636,745; 3,021,969; 3,031,093; 3,160,297; 3,178,043; 3,447,815; 3,455,472; 3,603,465; 3,632,138; 3,873,130; 3,885,146; 3,887,093; and 4,010,962.

BRIEF STATEMENT OF THE INVENTION

The invention, in brief, is directed to an assembly for centering a boat hull as it is moved onto or off of a boat trailer, whether the trailer is partially or fully submerged. The boat may be winched or driven onto and off of the trailer, or may be floated off of the trailer during launching and floated over the trailer during loading. The assembly includes a pair of longitudinal upright guides secured to opposite sides of the trailer to extend upwardly therefrom substantially the entire height of the hull along opposite sides of the hull. The guides are resilient throughout substantially their length and are spaced apart to simultaneously engage opposite sides of the hull by flexing toward or away from each other as the boat is moved longitudinally between the guides. Thus, the guides exert a centering force on the hull, and if during launching or loading the hull swings away from one of the guides, the other guide is engaged by the hull and exerts a restoring force on the hull to move the hull toward a centered position. Each guide is in the form of a tube, preferably a polyvinyl chloride tube, including the upright and a mounting portion curved generally normal to the upright portion and having flattened sides distended into tight engagement with a mount and reducing flexibility of the tube transversely of the hull.

More particularly, the guides are each formed with an upright which is resilient throughout substantially the entire length to engage the side of the hull and to exert a restoring or centering force on the hull sides. A face of the upright which engages the hull side is smoothly contoured and of low friction to avoid marring the hull. The upright is devoid of protuberances, such as hull engaging rollers, for example, which might snag portions of the hull such as spray rails and the like. The bottoms of the guides are provided with mounting portions rigidly mounting the uprights on the trailer. Each upright and mounting portion is preferably a single length of polyvinyl chloride tubing which is generally cylindrical and of relatively low friction, for providing the previously mentioned hull engaging faces.

To facilitate mounting of each guide on the trailer, and to increase the rigidity of the mounting portion in the direction of normal flexing of the upright, side faces of the mounting portion including a flattened flattened generally right angle curved bend therein which flows into the upright. An end of the mounting portion is received in a snuggly fitting channel with the flattened faces seated against legs of the channel. Upper and lower faces of the mounting portion are then clamped toward each other to distend the flattened faces into tight engagement with the channel legs, so that the mounting portion of the tube and the channel are rigidly secured to each other. The channel is suitably secured to the trailer crosswise thereof with the upright extending upwardly. The channels may be adjusted crosswise of the trailer to position the uprights spaced a desired distance from each other for optimum centering of the hull.

It is an object of this invention to provide a new and useful hull centering assembly for a boat trailer. A related object is provision of such an assembly having a pair of resilient guides for engaging opposite sides of the hull and exerting centering forces on the hull.

Another object is provision of a new and useful hull centering assembly for a boat trailer, the assembly being adapted to exert inwardly directed centering forces against opposite sides of the hull when the hull is seated on the trailer as well as during launching and loading of the hull. The assembly includes a pair of uprights each of a length between the bottom and top extremities thereof to extend upwardly alongside substantially the entire height of the hull. The uprights are resilient throughout substantially the length thereof for flexing upon engagement with the hull. The uprights have smoothly configured faces substantially continuous between their extremities for free sliding across the hull, with bottoms of the uprights rigidly mounted on the trailer. Related objects include the uprights being free of protuberances which could snag portions of the hull with an absence of engaging components being fixed to each other so that there relatively running parts. Each upright and mounting portion at the bottom thereof is an intergral polyvinyl chloride tube. The mounting portion has a generally right angle curved bend with opposite sides of the bend flattened in a manner to reduce resiliency of the bend in the direction of normal flexing of the upright. The upper and lower faces of the mounting portion are clamped toward each other to distend the flattened sides into engagement with legs of a rigid channel which receives the mounting portion.

A further object is provision of a new and useful subcombination of one guide as aforesaid.

These and other objects and advantages of the invention will be apparent from the following detailed description and the accompanying drawing.

BRIEF DESCRIPTION OF THE DRAWING

FIG. 1 is a schematic perspective view looking from the front of a typical boat trailer, and illustrating the boat centering assembly of this invention;

FIG. 2 is an enlarged, fragmentary, schematic, front sectional view taken generally along line 2—2 in FIG. 1, and illustrating a mounting portion of the assembly;

FIG. 3 is a further enlarged, fragmentary, schematic sectional view taken generally along the line 3—3 in FIG. 2;

FIG. 4 is a schematic elevational view of another form of mounting portion, with a portion of the trailer frame shown in section, and to a larger scale than FIG. 1;

FIG. 5 is an enlarged, fragmentary, schematic sectional view taken generally along the line 5—5 in FIG. 4;

FIG. 6 is a fragmentary, schematic elevational view, similar to FIG. 4, but showing another form of guide upright; and FIG. 7 is a diagram illustrating flexing of of the assembly as the hulls moves therebetween.

DESCRIPTION OF THE PREFERRED EMBODIMENTS

FIG. 1 illustrates a typical boat trailer comprising a frame 10 with side channels 12 merging at the front into a tongue 14 carrying a trailer hitch socket 16 proximate a typical winch 18. A pair of wheels 20 and fenders are suitably mounted on the side channels 12. Frame 10 carries rollers 22 and chocks 24 of any suitable type for the particular boat hull (not shown) to be carried by the trailer.

A boat hull centering assembly 30 includes a pair of guides 32 each having an upright portion 34 and a mounting portion 36 which is received by a mount 38 (FIGS. 2 and 3) adjustably secured to an adjacent frame side channel 12.

The upright portion 34 and the mounting portion 36 of each guide 32 is preferably formed of a resilient plastic tube. The mounting portion 36 is of substantially less flexibility in a direction crosswise of the trailer and boat hull, than is the upright portion 32 which is preferably flexible throughout its length or height. Accordingly the upright portion 32 may flex freely to accommodate the varying width of the hull as it moves longitudinally onto or off of the trailer. As shown in FIG. 1 (and FIG. 4) the mounting portion 36 is bowed inwardly to receive hulls narrower than the width of the trailer frame. In FIG. 6 the bow is omitted for use with wider hulls. Tops of the upright portions are flared outwardly slightly to more adequately receive the hull when the trailer is submerged and the hull is driven or floated over the trailer during loading of the hull onto the trailer. During loading the hull is loaded in this manner, it is brought proximate the normal hauling position over the trailer and the winch line is attached to the hull bow. The trailer and hull may then be towed from the water as the hull settles onto the rollers 22 and the chocks 24 with suitable hold downs (not shown) tightened to retain the hull in place on the trailer. The tops of the tubular uprights are preferably capped.

As shown in FIG. 3, the mounting portion 36 of each guide 32 has two sides flattened for more secure mounting in an inverted channel 44 of the mount 38, and for reducing the flexibility of the mounting portion 36 crosswise of the hull and trailer, as previously mentioned. An inwardly curved part of the mounting portion 36 terminates in a straight portion 46 which is snuggly received in the channel 44 (FIGS. 2 and 3). A pair of bolts 48 extend through holes in the bight of the channel, throught the straight portion 46, and through a plate 50, and are tightened in place by nuts 52. The flat sides of the tube are snuggly received in the channel 44 before the bolts 48 and nuts 52 are tightened, and upon tightening the upper and lower curved faces of the mounting portion are clamped toward each other thus distending the flat sides into tight engagement with the opposed legs of the channel 44. An inner end of the channel 44 is secured to the adjacent frame side member 12 for adjustment crosswise of the trailer to vary the spacing between the upright portions 34 of the guides 32 in accordance with the width of the particular hull. Once adjusted the mounting portion 36 remains fixed throughout loading, unloading and towing of the hull. A series of bolt receiving holes 58 (FIG. 2) are provided in the bight of the channel 44 for receiving a pair of bolts 60 which also extend through an upper plate 62 and a lower plate 64. The plate 64 operatively seats against lower edges of the opposed channel legs as the assembly is tightened in place against the frame side channel 12 by means of nuts 66. To vary the spacing between the upright portions 34 of the guides 32, the bolts 60 are removed and the channel 44 is moved inwardly or outwardly and the bolts 60 inserted into adjacent holes 58. The plate 64 is then replaced and the nuts 66 again tightened to clamp the guide 32 in the desired adjusted position on the side channel 12 of the trailer frame.

FIGS. 4 and 5 show other embodiments of mounting of the guide mounting portion 36 on a mount 70, and adjustable mounting of the mount 70 on the frame side channel 12. Herein, the straight portion 46 is received in a channel 72 as before, but a generally U-shaped channel member 74 embraces the curved bottom face of the guide straight portion 46 and the outsides of the channel legs, and is tightly clamped against straight portion 46 by a pair of blots 76. The bolts 76 extend through holes in a plate 78 seat against and spanning the top of the bight of the channel 72, and through holes in outwardly extending flanges 80 of the U-shaped channel member 74. The assembly is tightened in place by nuts 82 to distend the flattened sides of the straight portion 46 of the guide into tight engagement with the legs of the channel 72, as previously discussed with reference to the embodiment of FIGS. 2 and 3. Channel 72 is mounted on the frame side channel 12 by bolts 86 which pass through selected ones of a series of holes in the bight of the channel 72, as discussed with reference to the holes 58 in the bight of the channel 44 in FIGS. 2 and 3, and through the holes in plate 62, and tightened by nuts 88.

In FIG. 6 the previously mentioned embodiment of the guide without the bowed configuration of mounting portion 36 of FIG. 2, is illustrated with reference numerals primed, as 32', to indicate similar or identical parts to those previously described in FIGS. 1-3, and these parts need not be again discussed.

In all embodiments, the upright and mounting portions tube is preferably polyvinyl chloride (PVC). Depending on the size of the boat to be handled either one and one-quarter or one and one-half inch tubing is preferred. For one and one-quarter inch PVC tubes the actual outside diameter is 1.660"±0.005", with an inside diameter of 1.255" and a minumum wall thickness of 0.191". This tubing weighs 0,567 pounds per foot with a rating of psi 520, and volume in gallons per cubic foot of 6.43. For one and one-half inch tube the actual outside diameter is 1.900"±0.006", with an inside diameter of 1.476"and a minimum wall thickness of 0.200". This tubing weight 0.686 pounds per foot with a rating of psi 470 , volume in gallons per cubic foot of 8.89.

The PVC tube is shaped by first heating the tube, as is well known in the trade, and forming the heated tube into a longitudinally split mold, the other half of the mold clamped in place, and the tube allowed to cool. Thus, the mold forms the flattened sides of the mounting portion 36 or 36' with the curved upper and lower faces expanded slightly outwardly. By decreasing the normal outside diameter by flattening the sides and expanding the curved upper and lower faces, the flexibility of the mounting portion is substantially reduced and substantially all flexing of the tube is in the upright portion 34, thus reducing the overall flexibility of the tube.

The surface of PVC of the foregoing type is very smooth, so that the opposed faces of the guides 30 which engage the boat hull do not mar the hull. Since there are no protrusions on the upper portions 34 of the guides, there is nothing to snag on spray rails, or the like, of the hull, and the guides 30 flex resiliently to accommodate the varying width of the hull as it is moved onto or off of the trailer without the use of springs or rollers.

As illustrated diagrammaticly in FIG. 7, the guides are set far enough at position 32A so that the bow of the hull 90 can freely enter between them. As the hull continues to be moved between the guides 32, the guides flex outwardly as at 32B with continued movement of the hull 90 causes the guides to flex inwardly, as at 32C. Thus a centering force is constantly maintained against the hull 90. During launching or loading, should the stern of the hull swing off center of the trailer, one side of the hull will press against one of the guides 30 and may swing far enough to be free of the other guide, but the guide against which the hull rests exerts a centering force on the hull to swing it back toward a centered position.

While this invention has been described and illustrated with reference to particular embodiments in a particular environment, various changes may be apparent to one skilled in the art, and the invention is not to be limited to such embodiments or environment except as set forth in the appended claims.

What is claimed is:

1. A boat hull centering assembly for a boat trailer comprising in combination:

plural upright means comprising a one piece tubing being resilient throughout substantially the entire length thereof;

each of said upright means being substantially continuous throughout the length thereof and void of any protuberances for freely sliding across the boat hull;

each of said upright means having a mounting portion comprising an integral angle bend of said tubing defining upper and lower mounting faces and opposite side faces;

said opposite side faces of said tubing being flattened thereby reducing the flexibility of said tubing at said angle bend;

rigid channels for respectively mounting said plural upright means on opposite sides of the boat trailer;

said rigid channels adjustably securing said mounting portions relative to the boat trailer for spacing said plural upright means for enabling free passage of the bow of the boat hull therebetween while simultaneously applying an inward centering force against at least the widest portion of the hull thereby providing a centering force by the resiliency of said upright means during launching and loading of the boat hull.

2. An assembly as set forth in claim 1, wherein said rigid channel comprises two parallel legs interconnected by a bight;

said flat opposite sides of said mounting portion engaging said parallel legs of said rigid channel; and means for compressing one of said upper and lower mounting faces against said bight for distending said flat opposite sides into firm engagement with said legs to secure said upright means relative to the boat trailer.

3. An assembly as set forth in claim 1, wherein each of said tubings are constructed of polyvinyl chloride.

4. An assembly as set forth in claim 1, wherein the top extremities of each of said plural uprights diverge from each other for guiding the hull therebetween when the hull is floating above the trailer.

5. An assembly as set forth in claim 1, wherein said angle bend is a generally right angle bend; and said plural upright extending in a generally vertical direction.

6. An assembly as set forth in claim 1 wherein said rigid channel means comprises a plurality of spaced apertures;

threaded fastening means extending through selected ones of said plurality of spaced apertures for adjusting said rigid channel means relative to the boat trailer to vary the spacing between said plural upright means.

* * * * *

UNITED STATES PATENT AND TRADEMARK OFFICE
CERTIFICATE OF CORRECTION

PATENT NO. : 4,197,050
DATED : April 8, 1980
INVENTOR(S) : Leon H. Larson

It is certified that error appears in the above—identified patent and that said Letters Patent are hereby corrected as shown below:

Column 2, line 29, delete the second flattened;

Column 3, line 68, delete "loaded in this manner";

Column 4, line 1, delete "it is";

Column 5, line 14, delete "0,567" and insert -- 0.567;

Column 5, line 19, delete "weight" and insert -- weighs --.

Signed and Sealed this

Fifteenth Day of July 1980

[SEAL]

Attest:

SIDNEY A. DIAMOND

Attesting Officer

Commissioner of Patents and Trademarks